United States Patent
Tanaka et al.

(10) Patent No.: US 7,044,887 B2
(45) Date of Patent: May 16, 2006

(54) SHIFT CONTROL SYSTEM FOR AUTOMATIC TRANSMISSION

(75) Inventors: Hiroyasu Tanaka, Zama (JP); Shigeki Shimanaka, Hadano (JP); Satoshi Takizawa, Yokohama (JP); Masatoshi Akanuma, Fujisawa (JP); Takayuki Suzuki, Hiratsuka (JP)

(73) Assignee: Jatco LTD, Fuji (JP)

( * ) Notice: Subject to any disclaimer, the term of this patent is extended or adjusted under 35 U.S.C. 154(b) by 0 days.

(21) Appl. No.: 10/236,873

(22) Filed: Sep. 5, 2002

(65) Prior Publication Data

US 2003/0064855 A1  Apr. 3, 2003

(30) Foreign Application Priority Data

Sep. 7, 2001 (JP) ............................. 2001-271532

(51) Int. Cl.
*B60K 41/04* (2006.01)
*F16H 59/64* (2006.01)
*G06F 17/00* (2006.01)

(52) U.S. Cl. .................. 477/115; 477/98; 477/906; 701/63

(58) Field of Classification Search ............ 477/97, 477/98, 115, 123, 125, 128–9, 127, 906, 37, 477/43; 701/63
See application file for complete search history.

(56) References Cited

U.S. PATENT DOCUMENTS

| 4,039,061 | A | * | 8/1977 | Pruvot et al. ............... 477/37 |
| 4,764,156 | A | * | 8/1988 | Ohkumo ..................... 477/906 |
| 4,849,899 | A | * | 7/1989 | Cote et al. ................... 477/906 |
| 4,896,569 | A | * | 1/1990 | Ito et al. ....................... 477/65 |
| 4,918,606 | A | * | 4/1990 | Ito et al. ..................... 477/906 |
| 5,033,328 | A | * | 7/1991 | Shimanaka ................. 477/109 |
| 5,050,427 | A |   | 9/1991 | Cote et al. |
| 5,315,897 | A | * | 5/1994 | Abe et al. ..................... 477/98 |
| 5,439,426 | A | * | 8/1995 | Nakashima ................. 477/125 |
| 5,846,156 | A | * | 12/1998 | Meissner et al. ............. 477/43 |
| 5,855,532 | A | * | 1/1999 | Sugiyama ..................... 477/97 |
| 6,073,072 | A |   | 6/2000 | Ishii et al. |
| 6,292,730 | B1 | * | 9/2001 | Takizawa et al. ............ 477/68 |
| 6,370,468 | B1 | * | 4/2002 | Koga et al. ................... 477/43 |

FOREIGN PATENT DOCUMENTS

| EP | 0 352 551 |   | 1/1990 |
| JP | 05-118429 |   | 5/1993 |
| JP | 2000-60170 |   | 10/2000 |
| JP | 2002213584 | A * | 7/2002 |

* cited by examiner

Primary Examiner—Roger Pang
(74) Attorney, Agent, or Firm—Klarquist Sparkman LLP (57) ABSTRACT

A shift control system for a vehicle automatic transmission includes a vehicle speed sensor for detecting a vehicle speed, and a first control means normally performs a shift control of the transmission so that a target speed ratio of the transmission is achieved, which is determined based at least on a vehicle speed detected by the vehicle speed sensor. The shift control system further includes a second control means that properly performs shift control of the transmission when the vehicle speed sensor is in trouble, by generating a command for holding or changing a current speed ratio based on an input rotation speed of the transmission and/or driver's accelerating or decelerating operation of the vehicle.

15 Claims, 5 Drawing Sheets

SHIFT CONTROL SYSTEM FOR AUTOMATIC TRANSMISSION

BACKGROUND OF THE INVENTION

1. Field of the Invention

The present invention relates to a shift control system for an automatic transmission.

2. Description of Related Art

An automatic transmission inclusive of a continuously variable transmission is generally designed so as to determine a target speed ratio or shift range (collectively referred to as "speed ratio", hereinafter) based on the vehicle speed and the engine load, and to carry out shift control to hold or change the current speed ratio. Thus, when the vehicle speed sensor for detecting the vehicle speed encounters trouble due to failure, etc., an actual vehicle speed cannot be correctly detected and the detected vehicle speed value different from the actual vehicle speed may be used as one of the control parameters, thereby making it difficult or impossible to carry out a proper shift control.

In order to eliminate such a problem, a generally conceivable solution may be to perform shift control of the transmission based on a fixed vehicle speed at an intermediate level, e.g., 50 km/h, instead of incorrectly detected vehicle speed, assuming that a fixed vehicle speed of such a level does not hinder a steady running of the vehicle on ordinary road. However, it is considered that such a solution results in further problem.

That is to say, with the above-mentioned solution, since shift control is based on a fixed vehicle speed value at an intermediate level even in a stopped state of the vehicle, there may be caused so-called "high-starting" of the vehicle, wherein the accelerating performance of the vehicle deteriorates due to insufficient torque. This is because the fixed vehicle speed value at an intermediate level corresponds to a target speed ratio that is on a higher speed side in relation to the stopped state of the vehicle, and not to the speed ratio for the lowest-speed range required when actually starting the vehicle.

SUMMARY OF THE INVENTION

It is therefore a primary object of the present invention to provide an improved shift control system for an automatic transmission, which performs a proper shift control even when the vehicle speed sensor is in trouble, without causing the above-mentioned problems.

The present invention provides a shift control system for a vehicle automatic transmission which comprises a vehicle speed sensor for detecting a vehicle speed, and a first control means normally performs a shift control of the transmission so that a target speed ratio of the transmission is achieved, which is determined based at least on a vehicle speed detected by the vehicle speed sensor. The shift control system according to the invention further comprises a second control means that performs shift control of the transmission when the vehicle speed sensor is in trouble, by generating a command for holding or changing a current speed ratio based on an input rotation speed of the transmission and/or driver's accelerating or decelerating operation of the vehicle.

With the shift control system according to the present invention, when the vehicle speed sensor encounters trouble, the normal shift control by the first control means based on the detected vehicle speed is stopped. At the same time, the second control means performs shift control of the transmission by generating a command for holding or changing a current speed ratio based on an input rotation speed of the transmission and/or driver's accelerating or decelerating operation of the vehicle. Thus, even if the detected vehicle speed value is inaccurate due to failure of the vehicle speed sensor, the second control means properly performs a shift control in conformity with an intended driving condition of the vehicle as represented by the input rotation speed of the transmission and/or driver's accelerating or decelerating operation, without causing a noticeably unnatural feel.

Also, it is possible to avoid the above-mentioned problems arising from use of a fixed vehicle speed value when the vehicle speed sensor is in trouble, i.e., high-starting of the vehicle from its stopped state with a degraded accelerating performance.

The second control means is preferably operative with a hysteresis region of the input rotation speed of the transmission, such that the current speed ratio is held in the hysteresis region. In this instance, it is possible effectively to prevent hunting of the shift control and improve the drivability of the vehicle, by avoiding unnecessary change of the target speed ratio due to a change of the transmission input rotation speed, while achieving a high speed rotation or a low speed rotation when acceleration or deceleration of the vehicle is intended by the driver, respectively.

The first and second control means are preferably designed so that when the vehicle speed sensor and the transmission input rotation sensor for detecting the input rotation speed of the transmission are in trouble, the shift control by the second control means is prohibited and the shift control by the first control means is performed with a fixed vehicle speed value instead of the vehicle speed detected by the vehicle speed sensor. In this instance, although the above-mentioned problems arising from use of a fixed vehicle speed value may occur when the vehicle speed sensor is in trouble, the shift control is performed on a safety side so as to eliminate a potential risk that may be caused when the vehicle speed sensor and the transmission input rotation sensor are both in trouble.

The driver's accelerating or decelerating operation may be detected by an idle switch and a brake switch of the vehicle, which are operated upon depression of an accelerator pedal and a brake pedal of the vehicle, respectively. In this instance, the shift control can be advantageously performed by directly detecting the accelerating or decelerating operation of the driver.

In this connection, the second control means is preferably operative when the brake switch is in trouble, based on a judgment that the brake pedal operation is absent. Thus, when the brake switch is in trouble, the shift control can be performed on a safety side by holding the current speed ratio so as to eliminate a potential risk that may be caused when the vehicle speed sensor and brake switch are both in trouble.

Alternatively, the driver's accelerating or decelerating operation may be detected by an accelerator pedal sensor for detecting a depression amount of an accelerator pedal of the vehicle. In this instance also, the shift control can be advantageously performed by directly detecting the accelerating or deceleration operation of the driver.

The second control means is preferably operative when hydraulic oil temperature of the transmission exceeds a predetermined value, based on a judgment that the depression amount of the accelerator pedal is a small amount, for suppressing the rotation speed of the transmission by enhancing an upshift tendency. In this instance, it is possible effectively to prevent overheating of the transmission hydraulic oil by suppressing the rotation speed of the transmission.

The second control means is preferably operative with a hysteresis region of the driver's accelerating or decelerating operation, such that the current speed ratio is held in the hysteresis region. In this instance, it is possible effectively to prevent hunting of the shift control and improve the drivability of the vehicle, by avoiding unnecessary change of the target speed ratio despite a change of the driver's accelerating or decelerating operation, while achieving a high speed rotation or a low speed rotation when acceleration or deceleration of the vehicle is intended by the driver, respectively.

The second control means is preferably designed so as to change the current speed ratio at a reduced speed, to thereby effectively eliminate the driver's discomfort when the vehicle speed sensor is in trouble.

The shift control system may comprise a step motor that can be operated by a target step number when the vehicle speed sensor is in trouble, wherein the target step number of the step motor has upper and lower limit values. In this instance, it is possible to eliminate possible overshooting of the speed ratio that may be caused by a torque shift or the like, if the difference between the target speed ratio and the actual speed ratio is not fed back in the above-described shift control when the vehicle speed sensor is in trouble.

BRIEF DESCRIPTION OF THE DRAWINGS

The present invention will be further explained below with reference to preferred embodiments shown in the accompanying drawings.

DETAILED DESCRIPTION OF THE PREFERRED EMBODIMENTS

Figure 1:
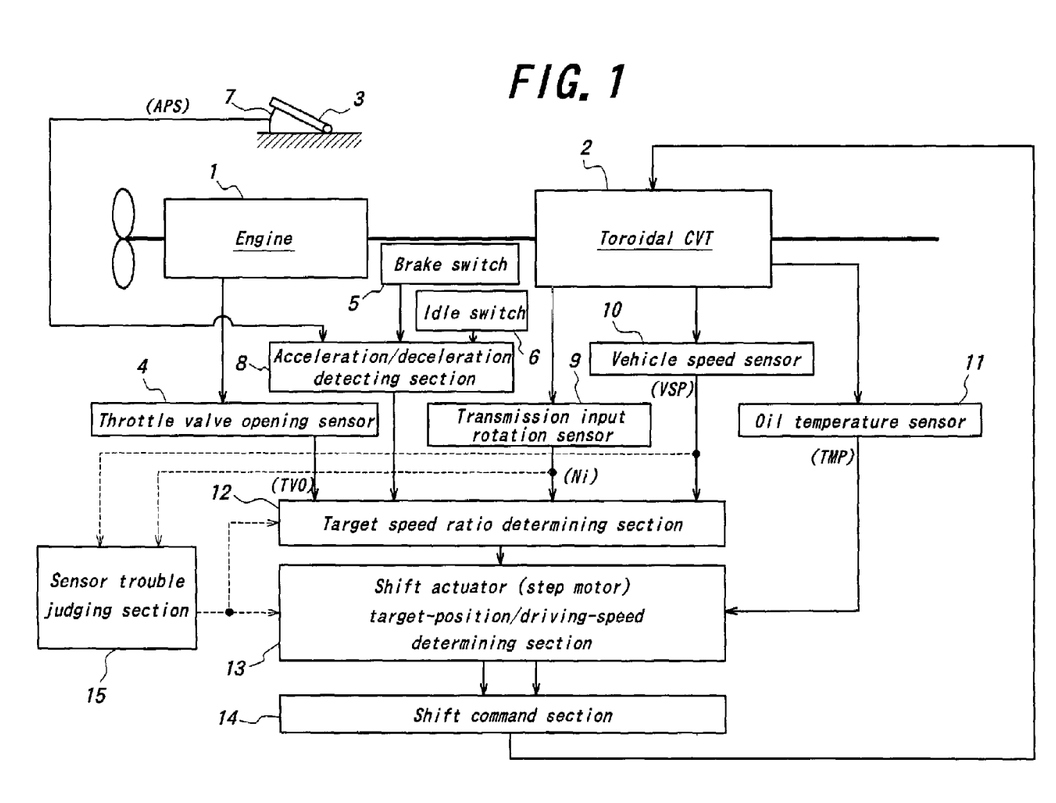
FIG. 1 is a block diagram showing a shift control system for an automatic transmission according to one embodiment of the present invention.

Referring now to the drawings, FIG. 1 shows a shift control system for an automatic transmission, including a shift control device that operates when a vehicle speed sensor is in trouble in accordance with one embodiment of the present invention. In FIG. 1, reference numeral 1 denotes an engine, and 2 an automatic transmission in the form of a toroidal-type continuously variable transmission (CVT). The output power of the engine 1 is controlled in accordance with the throttle valve opening TVO that, in turn, is basically determined by the depression amount of an accelerator pedal 3, in a conventional manner.

Although not shown in the drawings, the toroidal-type continuously variable transmission 2 includes an input disk to which the rotation of the engine 1 is supplied, an output disk which is connected coaxially with the input disk and drivingly connected to driving wheels, and power rollers for transmitting power by frictional engagement between the input and output disks. The power rollers can be tilted about the respective swing axes perpendicular to the rotation axes thereof, so that shifting to another speed ratio is performed by changing the radius of circular locus of the power rollers in contact with the input and output disks.

The shift control of the above-mentioned toroidal-type continuously variable transmission 2 is performed based on signals from various sensors, including (i) a signal from a throttle valve opening sensor 4 for detecting the throttle valve opening TVO of the engine 1, (ii) a signal from an acceleration/deceleration detecting section 8 for detecting acceleration or deceleration of the vehicle, either according to the ON/OFF states of a brake switch 5 that is turned ON when the brake pedal is depressed and an idle switch 6 that is turned ON when the accelerator pedal 3 is released, or according to an accelerator pedal depression amount APS as detected by an accelerator opening sensor 7, (iii) a signal from a transmission input rotation sensor 9 for detecting a transmission input rotation speed Ni to the input disk, (iv) a signal from a vehicle speed sensor 10 for detecting a vehicle speed VSP from a transmission output rotation speed, and (v) a signal from an oil temperature sensor 11 for detecting a transmission hydraulic oil temperature TMP. According to these signals, the shift control of the continuously variable transmission 2 is performed by means of a target speed ratio determining section 12, a shift actuator (i.e., a step motor) target-position/driving-speed determining section 13, as well as a shift command section 14.

Figure 5:
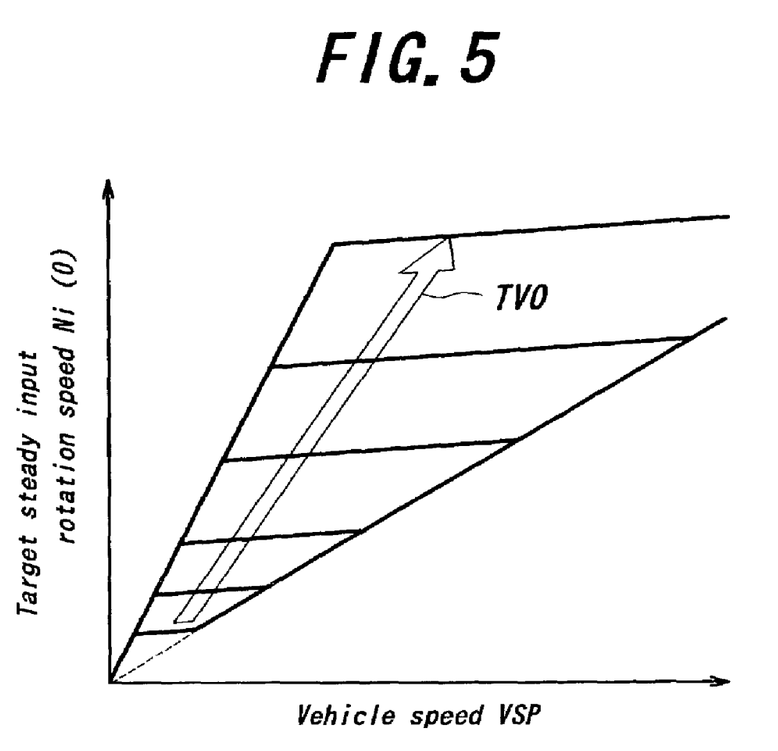
FIG. 5 is a shift map diagram for a continuously variable transmission, which may be used for an ordinary shift control carried out when the vehicle speed sensor is in normal operation.

In ordinary shift control in which the vehicle speed sensor 10 is normal, the target speed ratio determining section 12 determines the following three target values, i.e., a target steady input rotation speed Ni(0), a target steady speed ratio, and a target transient speed ratio. The target steady input rotation speed Ni(0) is obtained from the throttle opening TVO and the vehicle speed VSP based on a shift map such as that shown in FIG. 5, for which a detailed description is not required. The target steady speed ratio is calculated by dividing the target steady input rotation speed Ni(0) by a transmission output rotation speed, which is a function of the vehicle speed VSP. The target transient speed ratio is obtained by filtering the calculated target steady speed ratio to determine the degree of response with which the calculated target steady speed ratio is to be achieved, and/or by other suitable signal processing to compensate for, or exclude influence of a torque shift generated in the continuously variable transmission.

The shift actuator target-position/driving-speed determining section 13 determines a target position or a target step number of the step motor for realizing the transient target speed ratio while taking into account the oil temperature TMP detected by the sensor 11, and also determines the driving speed of the step motor to the target position or target step number (i.e., shift speed of the transmission 2).

The shift command section 14 generates a command of the target position (target step number) and the driving speed (shift speed) to the shift actuator in the toroidal continuously variable transmission 2 to hold the current speed ration or perform shifting to another speed ratio depending upon the signals from the above-mentioned sensors.

Figure 2:
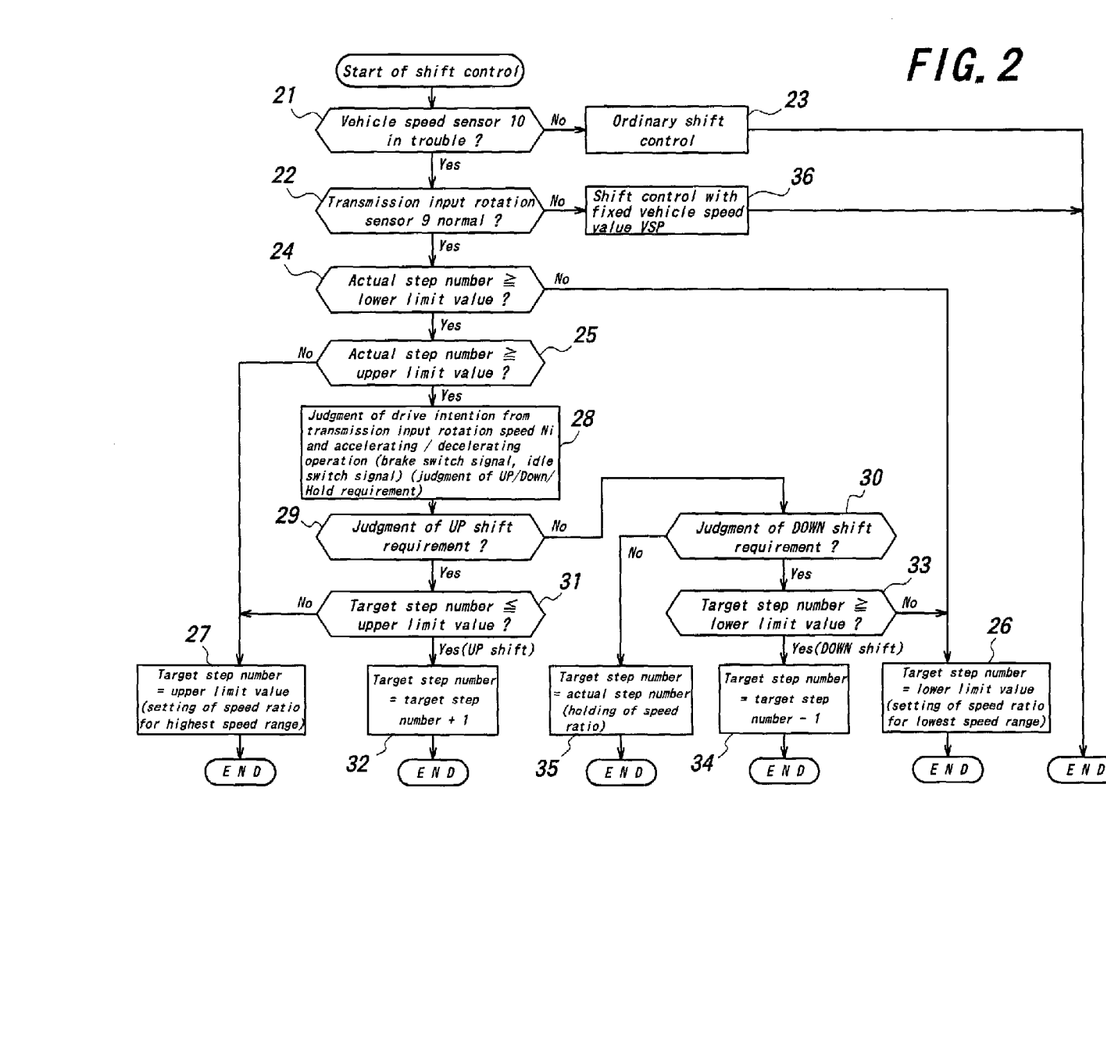
FIG. 2 is a flowchart of a shift control program executed in the embodiment of FIG. 1 when the vehicle speed sensor is in trouble.

In the embodiment shown in FIG. 1, the shift control system includes a sensor trouble judging section 15 for judging whether the transmission input rotation sensor 9 and/or the vehicle speed sensor 10 are in trouble. If it is judged at the section 15 that the vehicle speed sensor 10 alone is in trouble, or the vehicle speed sensor 10 and the transmission input rotation sensor 9 are both in trouble, the judgment result is supplied to the target speed ratio determining section 12 and the shift actuator target-position/driving-speed determining section 13, so as to perform a shift control that is different from the above-mentioned ordinary shift control, in the manner to be explained below with reference to FIGS. 2 and 3. It is noted that FIG. 2 shows the entire shift control including both the ordinary shift control and the shift control carried out when the vehicle speed sensor is in trouble.

First, it is judged in step 21 whether or not the vehicle speed sensor 10 is in trouble, and it is further judged in step 22 whether or not the transmission input rotation sensor 9 is in trouble. If it is judged in step 21 that the vehicle speed sensor 10 is normal, the control proceeds to step 23 where the above-described ordinary shift control is carried out. The ordinary shift control can be properly performed irrespective of whether or not the transmission input rotation sensor 9 is in trouble, as can be appreciated from the foregoing description.

If it is judged in step 21 that the vehicle speed sensor 10 is in trouble, and it is further judged in step 22 that the transmission input rotation sensor 9 is normal, the shift control at the time of sensor trouble, which is a primary objective of the present invention, is carried out as explained below, based on the transmission input rotation speed Ni detected by the sensor 9 instead of the vehicle speed VSP and also based on a signal from the acceleration/deceleration detecting section 8. The control thus proceeds to steps 24 and 25, where it is judged whether the actual step number (corresponding to actual speed ratio) of the shift actuator (step motor) is within an allowable range between the upper and lower limits that are set to prevent an undesirable overshooting of the speed ratio, or lower than the lower limit value, or higher than the upper limit value.

If it is judged in step 24 that the actual number of steps of the shift actuator (step motor) is lower than the lower limit value, the control proceeds to step 26 where the target step number is made the lower limit value to set the speed ratio for the lowest speed range. If in step 24 the actual stem number is greater than or equal to the lower limit value, the control proceeds to step 25. If it is judged in step 25 that the actual step number of the shift actuator (step motor) is higher than the upper limit value, the control proceeds to step 27 where the target step number is made the upper limit value to set the speed ration for the highest speed range. In the shift control carried out when the vehicle speed sensor is in trouble, if the difference between the target speed ratio and the actual speed ratio is not fed back, undesirable overshooting of the speed ratio due to torque shift of the transmission, etc. may occur. However, by setting the upper and lower limits of the target step number (speed ratio) as described above, it is possible effectively to preclude the possibility of such overshooting.

On the contrary, if it is judged in steps 24 and 25 that the actual step number of the shift actuator (step motor) is within an allowable range between the upper and lower limits, the control proceeds to step 28 to carry out the shift control according to the present invention with the vehicle speed sensor in trouble, as described below.

Figure 3:
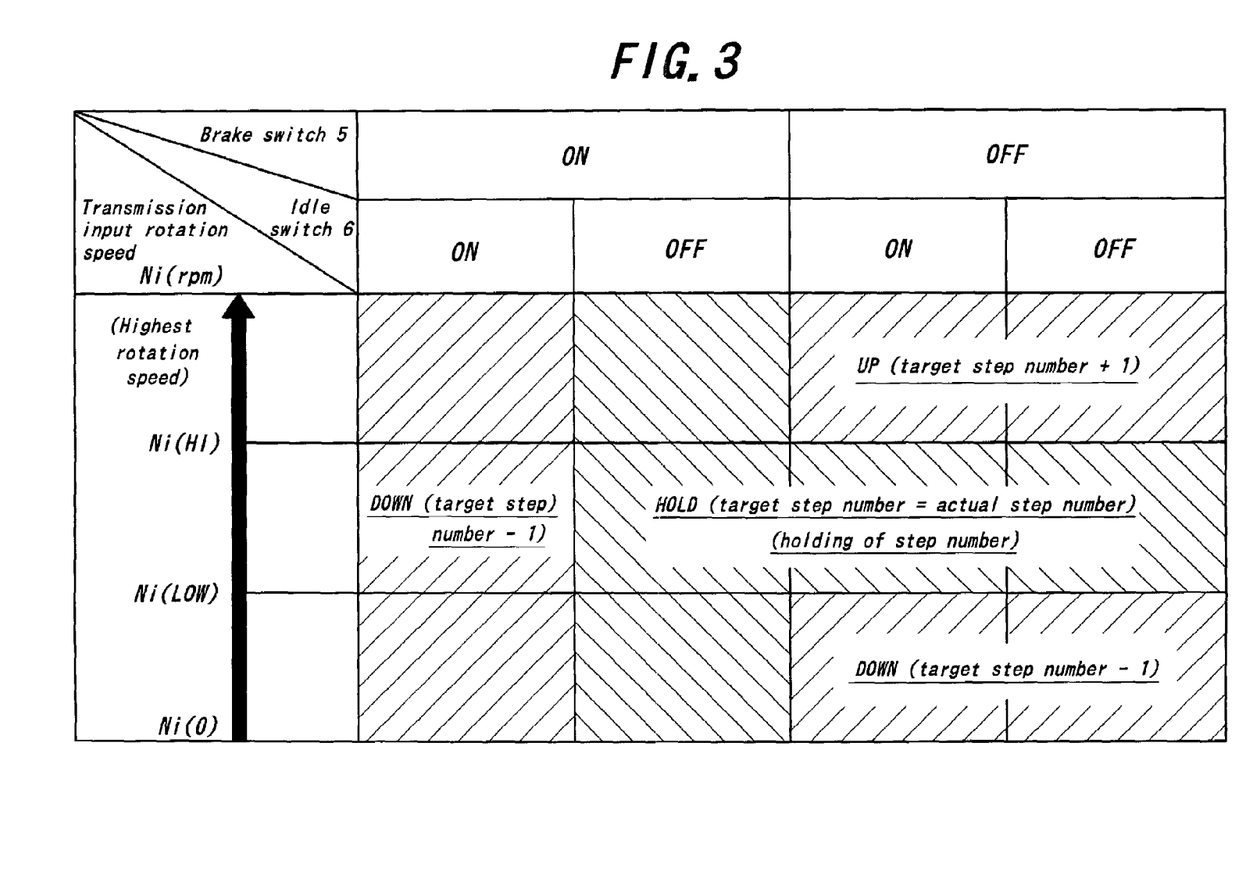
FIG. 3 is a shift map diagram for the embodiment shown in FIG. 1, which may be used when the vehicle speed sensor is in trouble.

First, in step 28, an intended driving condition of the vehicle is judged with reference to the map of FIG. 3, from the transmission input rotation speed Ni and also from the acceleration/deceleration judgment based on the ON/OFF states of the brake switch 5 and the idle switch 6, to judge whether an upshift (UP) of the continuously variable transmission is required, or a downshift (DOWN) thereof is required, or a holding of the current speed ratio (HOLD) is required.

The control proceeds to steps 29 and 30, where it is judged whether the judgment result in step 28 is an upshift requirement (UP), a downshift requirement (DOWN), or a speed ratio holding requirement (HOLD).

If it is judged that the judgment result is the upshift requirement (UP), until it is judged in step 31 that the target step number has reached the upper limit value, the control proceeds to step 32 where one step is added to the previous target step number. By increasing the target step number by one step each time, the upshift is caused to proceed. After it is judged in step 31 that the target step number has reached a value higher than the upper limit value, the control proceeds to step 27 where the target step number is kept at the upper limit value.

If it is judged that the judgment result in step 28 is the downshift requirement (DOWN), until it is judged in step 33 that the target step number has reached the lower limit value, the control proceeds to step 34, where one step is subtracted from the previous target step number. By decreasing the target step number by one step each time, the downshift is caused to proceed. After it is judged in step 33 that the target step number reached a value smaller than the lower limit value, the control proceeds to step 26 where the target step number is kept at the lower limit value.

If it is judged that the judgment result in step 28 is the speed ratio holding requirement (HOLD), the control proceeds to step 35 where the target step number is kept at the actual step number so that the current speed ratio is held.

In the embodiment explained above with reference to FIGS. 1 to 3, when the vehicle speed sensor 10 is in trouble, the intended driving condition of the vehicle is judged based on the transmission input rotation speed Ni and the accelerating/decelerating operation of the driver as judged from the ON/OFF states of the brake switch 5 and the idle switch 6, and the required shift direction is judged from the intended driving condition so that shifting in the required direction is carried out to attain the target speed ratio.

In this way, when the vehicle speed sensor 10 encounters trouble, an ordinary shift control for determining the target speed ratio based on the vehicle speed VSP is stopped, and the target speed ratio is corrected so as to conform with the intended driving condition as judged from the transmission input rotation speed Ni and the driver's accelerating/decelerating operation to properly carry out shift control. Thus, even if the detected vehicle speed value VSP is inaccurate due to failure of the vehicle speed sensor 10, the shift control of the continuously variable transmission can be properly carried out in conformity with the intended driving condition of the vehicle as represented by the input rotation speed Ni of the transmission, without causing a noticeably unnatural feel.

Also, it is possible to avoid the problems arising from use of a fixed vehicle speed value VSP when the vehicle speed sensor 10 is in trouble, i.e., high-starting of the vehicle from its stopped state with a degraded accelerating performance.

The embodiment illustrated in FIGS. 1 to 3 provides a hysteresis region between a lower set value Ni(LOW) and an upper set value Ni(HI) of the transmission input rotation speed Ni as shown in FIG. 3, so as to hold the current speed ratio or prohibit shifting to another speed ratio in the hysteresis region. It is thus possible effectively to prevent hunting of the shift control and improve the drivability of the vehicle, by avoiding unnecessary change of the target speed ratio due to a change of the transmission input rotation speed, while achieving a high speed rotation or a low speed rotation when acceleration or deceleration of the vehicle is intended, respectively.

The embodiment illustrated in FIGS. 1 to 3 further provides a hysteresis region for the driver's accelerating or decelerating operation, i.e., for the combination of ON state of the brake switch and OFF state of the idle switch 6 as shown in FIG. 3, so as to hold the current speed ratio or prohibit shifting to another speed ratio in the hysteresis region. It is thus possible effectively to prevent hunting of the shift control and improve the drivability of the vehicle, by avoiding unnecessary change of the target speed ratio due to a change of the transmission input rotation speed, while achieving a high speed rotation or a low speed rotation when acceleration or deceleration of the vehicle is intended, respectively.

Also, the accelerating or decelerating operation of the driver is detected by the ON/OFF state of the idle switch 6 (i.e., presence or absence of an accelerator pedal operation) and the ON/OFF state of the brake switch 5 (i.e., presence or absence of brake pedal operation) as shown in FIG. 3, so that the shift control can be accurately performed by directly detecting the driver's accelerating or decelerating operation.

In this connection, when the brake switch 5 also is in trouble, the shift control is performed on a safety side by holding the current speed ratio as shown in FIG. 3, based on a judgment that the brake pedal operation is absent. It is therefore possible to eliminate a potential risk that may be caused when the vehicle speed sensor 10 and the brake switch 5 are both in trouble.

When it is judged in step 22 in FIG. 2 that the transmission input rotation sensor 9 also is in trouble, the shift control is performed with a fixed vehicle speed value (e.g., 50 km/h) instead of the vehicle speed VSP that may be incorrectly detected by the vehicle speed sensor 10. In this instance, although problems may occur arising from use of the fixed vehicle speed value when the vehicle speed sensor 10 is in trouble, the shift control is performed on a safety side based on the shift map shown in FIG. 5 and using the fixed vehicle speed value and the throttle opening TVO, so as to eliminate a potential risk that may be caused when the vehicle speed sensor 10 and the transmission input rotation sensor 9 are both in trouble.

In the above-described embodiment, the judgment of the acceleration/deceleration operation in step 28 in FIG. 2 is made based on the ON/OFF states of the brake switch 5 and the idle switch 6. Alternatively, however, it is also possible to judge the acceleration/deceleration operation based on the accelerator pedal depression amount APS as detected by the accelerator opening sensor 7 shown in FIG. 1.

Figure 4:
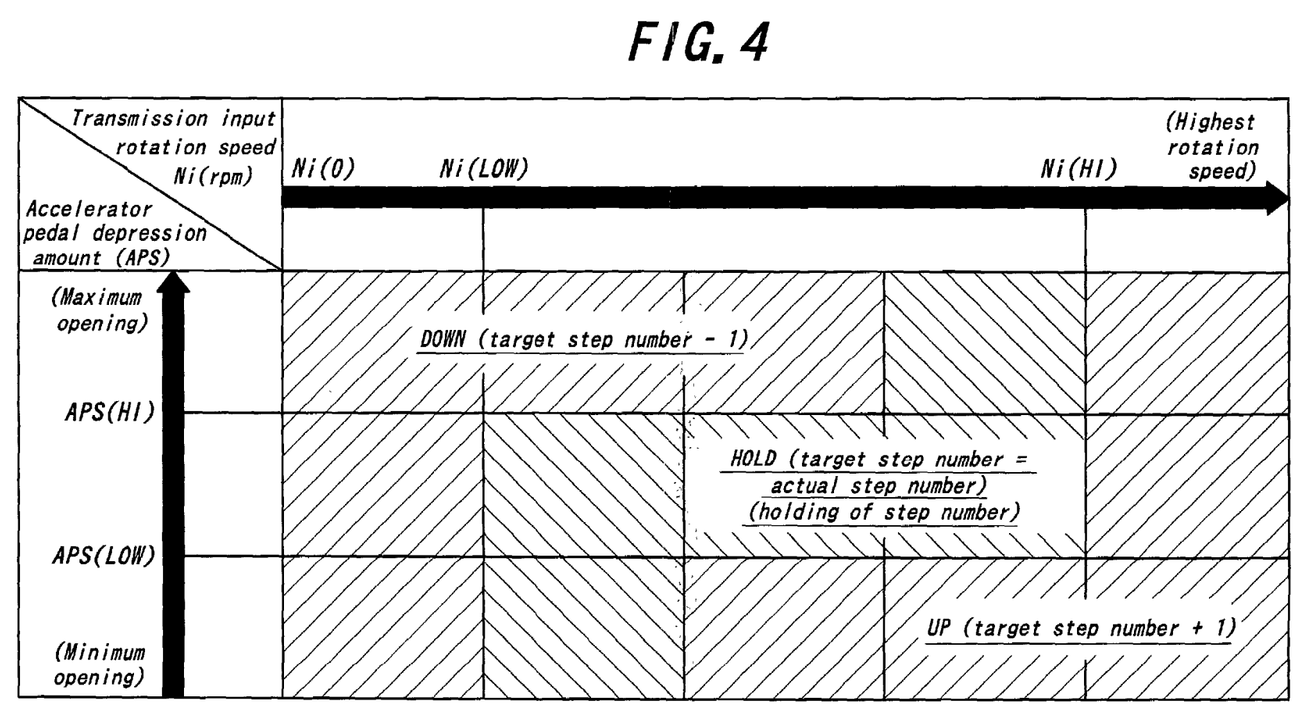
FIG. 4 is a shift control map diagram for an alternative embodiment of the present invention, which may be used when the vehicle speed sensor is in trouble.

In this instance, in step 28 in FIG. 2, the intended driving condition of the vehicle is judged from the transmission input rotation speed Ni and the accelerator pedal depression amount APS based on a map such as that shown in FIG. 4, and it is judged whether an upshift (UP) of the continuously variable transmission is required, a downshift (DOWN) thereof is required, or a holding of the current speed ratio (HOLD) is required. Then, the shift control when the vehicle speed sensor 10 is in trouble is carried out according to the judgment result in the same way as described above, so as to achieve essentially the same operation and effects as previous embodiment.

As shown in FIG. 4, this alternative embodiment also provides a hysteresis region between a lower set value Ni(LOW) and an upper set value Ni(HI) of the transmission input rotation speed Ni, so as to hold the current speed ratio or prohibit shifting to another speed ratio in the hysteresis region. It is thus possible effectively to prevent hunting of the shift control and improve the drivability of the vehicle, as in the previous embodiment.

As further shown in FIG. 4, a hysteresis region is provided also for the accelerator pedal depression amount APS that forms the basis for the acceleration/deceleration operation judgment, between a lower set value APS(LOW) and an upper set value APS(HI), so as to hold the current speed ratio or prohibit shifting to another speed ratio in the hysteresis region. It is thus possible effectively to prevent hunting of the shift control and improve the drivability of the vehicle, as in the previous embodiment.

When the accelerating/decelerating operation is detected from the accelerator pedal depression amount APS as described above, if the transmission hydraulic oil temperature TMP is likely to exceed a predetermined oil temperature, the accelerator pedal depression amount APS is judged to be a small amount smaller than the lower set value APS(LOW) regardless of the detected value, for suppressing the rotation speed of the transmission by enhancing an upshift tendency. In this therefore possible effectively to prevent overheating of the transmission hydraulic oil by suppressing the rotation speed of the transmission.

In both of the embodiments described above, when the vehicle speed sensor 10 is in trouble, in addition to the shift control at the time of trouble, the shift control is advantageously carried out so that the shift speed of the transmission or the driving speed of the step motor as determined by the means 13 in FIG. 1 is made lower than the shift speed in the ordinary shift control, so as to effectively eliminate driver's discomfort when the vehicle speed sensor 10 is in trouble.

Also, in both of the embodiments described above, during the shift control carried out when the vehicle speed sensor 10 is in trouble, it is preferred that just before the vehicle stops, when the transmission input rotation speed Ni becomes lower than the set value, the target step number is slightly increased so as to perform an upshift to a speed ratio on a high speed side. In this case, particularly when the automatic transmission is a V-belt-type continuously variable transmission, it is possible effectively to prevent the V-belt from slipping that may be caused by imbalanced oil pressure between a pair of belt pulleys.

While the present invention has been described above with reference to specific embodiments shown in the accompanying drawings, they were presented for illustrative purpose only, and various changes or modifications may be made without departing from the scope of the invention as defined by the appended claims.

The invention claimed is:

1. A shift control system for a continuously variable transmission, comprising:
   a vehicle speed sensor for detecting a vehicle speed;
   a first control means for normally performing a shift control of the transmission so that a target speed ratio of the transmission is achieved, said target speed ratio being determined based at least on a vehicle speed detected by the vehicle speed sensor; and
   a second control means for performing a shift control of the transmission when the vehicle speed sensor is in trouble, by generating a command for holding or changing a current speed ratio based at least on an input rotation speed of the transmission;
   said second control means being operative with a hysteresis region of the input rotation speed of the transmission, such that the current speed ratio is held while the input rotation speed of the transmission is in said hysteresis region.

2. The shift control system according to claim 1, wherein said system has a shift map defining a first region in which the current speed ratio is held when the input rotation speed of the transmission is within a predetermined range, and a second region in which the current speed ratio is increased or decreased when the input rotation speed of the transmission is out of said predetermined range, and wherein the shift control is performed when the vehicle speed sensor is in trouble, in accordance with said shift map and based on the input rotation speed of the transmission.

3. The shift control system according to claim 2, wherein the shift control is performed when the input rotation speed of the transmission is out of said predetermined range, by increasing or decreasing the speed ratio by a predetermined amount for each shift control cycle.

4. The shift control system according to claim 1, further comprising a transmission input rotation sensor for detecting the input rotation speed of the transmission, wherein said first and second control means are designed so that, when the vehicle speed sensor and the transmission input rotation sensor are in trouble, the shift control by said second control means is prohibited and the shift control by said first control means is performed with a fixed vehicle speed value instead of the vehicle speed detected by the vehicle speed sensor.

5. The shift control system according to claim 1, wherein said second control means is designed so as to change the current speed ratio at a reduced speed.

6. The shift control system according to claim 1, comprising a step motor that can be operated to achieve a target step number when said vehicle speed sensor is in trouble, said target step number having an upper limit value and a lower limit value.

7. A shift control system for a continuously variable transmission, comprising:
a first control means for normally performing a shift control of the transmission so that a target speed ratio of the transmission is achieved, said target speed ratio being determined based at least on a vehicle speed detected by a vehicle speed sensor;
a second control means for performing a shift control of the transmission when the vehicle speed sensor is in trouble, by generating a command for holding or changing a current speed ratio based at least on a driver's accelerating or decelerating operation of the vehicle; and
an accelerator pedal sensor for detecting a depression amount of an accelerator pedal of the vehicle, wherein said driver's accelerating or decelerating operation is detected by said accelerator pedal sensor;
wherein said second control means is operative when a hydraulic oil temperature of the transmission exceeds a predetermined value, based on a judgment that said depression amount of the accelerator pedal is a small amount, for suppressing the rotation speed of the transmission by enhancing an upshift tendency.

8. A shift control system for a continuously variable transmission, comprising:
a first control means for normally performing a shift control of the transmission so that a target speed ratio of the transmission is achieved, said target speed ratio being determined based at least on a vehicle speed detected by a vehicle speed sensor;
a second control means for performing a shift control of the transmission when the vehicle speed sensor is in trouble, by generating a command for holding or changing a current speed ratio based at least on a driver's accelerating or decelerating operation of the vehicle; and
an accelerator pedal sensor for detecting a depression amount of an accelerator pedal of the vehicle, wherein said driver's accelerating or decelerating operation is detected by said accelerator pedal sensor;
wherein said second control means is designed so as to change the current speed ratio at a reduced speed.

9. A shift control system for a continuously variable transmission, comprising:
a vehicle speed sensor for detecting a vehicle speed;
a first control means for normally performing a shift control of the transmission so that a target speed ratio of the transmission is achieved, said target speed ratio being determined based at least on a vehicle speed detected by the vehicle speed sensor;
a second control means for performing a shift control of the transmission when the vehicle speed sensor is in trouble, by generating a command for holding or changing a current speed ratio based on an input rotation speed of the transmission and a driver's accelerating or decelerating operation of the vehicle;
said second control means being operative with a hysteresis region of the input rotation speed of the transmission, such that the current speed ratio is held while the input rotation speed of the transmission is in said hysteresis region; and
an accelerator pedal sensor for detecting a depression amount of an accelerator pedal of the vehicle, wherein said driver's accelerating or decelerating operation is detected by said accelerator pedal sensor.

10. The shift control system according to claim 9, wherein said system has a shift map defining a first region in which the current speed ratio is held when the input rotation speed of the transmission is within a predetermined range, and a second region in which the current speed ratio is increased or decreased when the depression amount of the accelerator pedal is out of said predetermined range, and wherein the shift control is performed when the vehicle speed sensor is in trouble, in accordance with said shift map and based on the input rotation speed of the transmission and also on the depression amount of the accelerator pedal.

11. The shift control system according to claim 10, wherein the shift control is performed when the input rotation speed of the transmission and the depression amount of the accelerator pedal are out of the predetermined ranges, respectively, by increasing or decreasing the speed ratio by a predetermined amount for each shift control cycle.

12. The shift control system according to claim 9, wherein said second control means is operative when a hydraulic oil temperature of the transmission exceeds a predetermined value, based on a judgment that said depression amount of the accelerator pedal is a small amount, for suppressing the rotation speed of the transmission by enhancing an upshift tendency.

13. The shift control system according to claim 9, wherein said second control means is operative with a hysteresis region of the driver's accelerating or decelerating operation, such that the current speed ratio is held in said hysteresis region.

14. The shift control system according to claim 9, wherein said second control means is designed so as to change the current speed ratio at a reduced speed.

15. The shift control system according to claim 9, comprising a step motor that can be operated by a target step number when said vehicle speed sensor is in trouble, said target step number having an upper limit value and a lower limit value.

* * * * *